No. 894,873.

PATENTED AUG. 4, 1908.

H. W. BLAISDELL.
SYSTEM OF CLEANING FILTERS.
APPLICATION FILED NOV. 16, 1904.

WITNESSES:
E. Freeman Mould
C. A. Palmer.

INVENTOR
Hiram W. Blaisdell
BY
C. Stephen Rogers
his ATTORNEY

UNITED STATES PATENT OFFICE.

HIRAM W. BLAISDELL, OF LOS ANGELES, CALIFORNIA.

SYSTEM OF CLEANING FILTERS.

No. 894,873.　　　　　Specification of Letters Patent.　　　　Patented Aug. 4, 1908.

Application filed November 16, 1904. Serial No. 233,007.

*To all whom it may concern:*

Be it known that I, HIRAM W. BLAISDELL, a citizen of the United States, residing at Los Angeles, in the county of Los Angeles and State of California, have invented certain new and useful Improvements in Systems of Cleaning Filters; and I do hereby declare the following to be a full, clear, and exact description of the invention, such as will enable others skilled in the art to which it appertains to make and use the same.

This invention relates to systems of handling material, and particularly to mechanical means for removing material from and returning the same to filters and some of the objects of the invention are to provide means of this general character which will be simple and cheap in construction and positive and effective in operation.

Another object of the invention is to provide for the removal of filtering material from one filtration plant, or filter bed, to another in one continuous cycle of operation.

It is also an object of the invention to provide for the cleansing or purifying of material during the transfer operation.

A further object of the invention is to provide for the collection or removal of the material in one filtration plant or filter bed, transfer or transportation to another filtration plant or filter bed, and finally the distribution of the filtering material in the filtration plant or filter bed to which the material is transferred.

Furthermore an object of the invention is to accomplish the foregoing results without the intervention of manual labor, the entire operation being effected mechanically.

Figure 2:
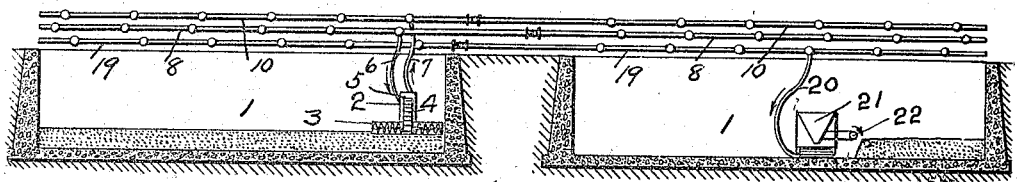
Figure 1:
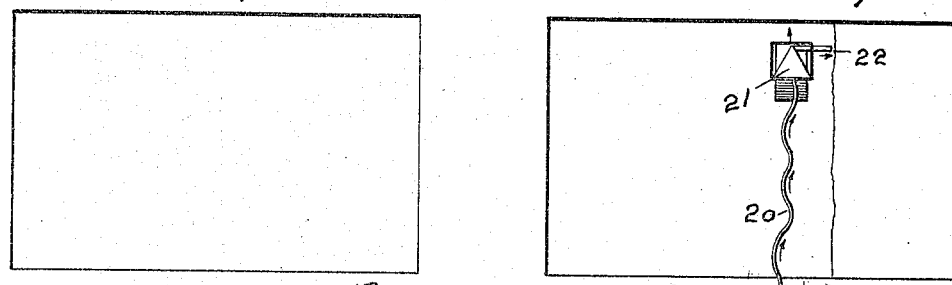
Figure 1:
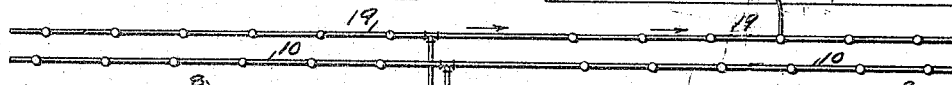
Figure 1:
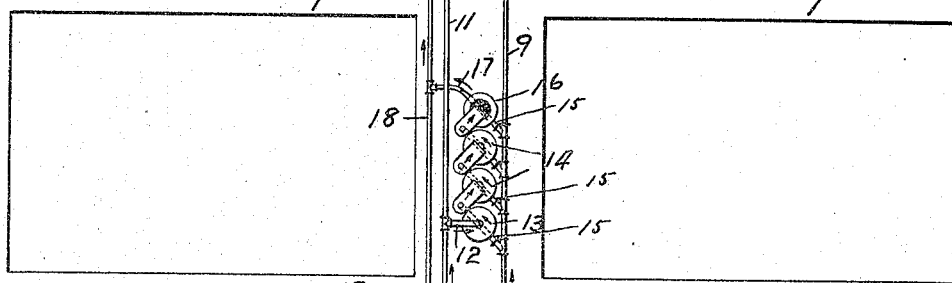
Figure 1:
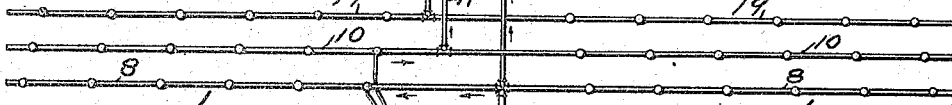
Figure 1:
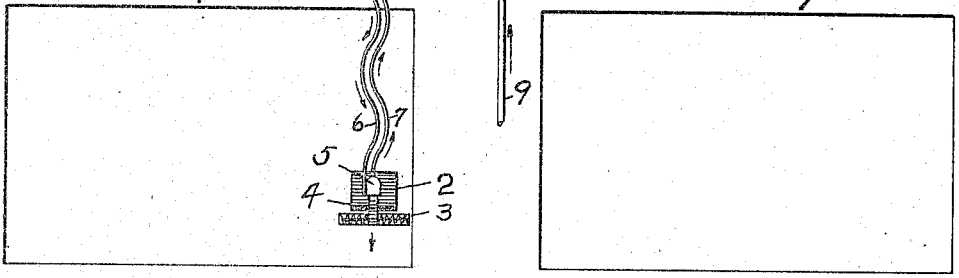

With these, and other objects in view, the invention consists essentially in the construction, combination and arrangement of parts substantially as more fully described in the following specification, and as illustrated in the accompanying drawing, forming part of this application, in which Figure 1 is a diagrammatic view illustrating a manner of carrying out the invention, or putting the same in practice, in connection with contiguous filtration plants or filter beds; and Fig. 2 is a sectional view of the same.

Similar characters of reference designate corresponding parts throughout the several views.

It will be understood that this invention is not limited or confined to use with or upon filtration plants or filter beds; although the same is illustrated in connection therewith as an application of the invention; but it is merely typical. In this application of the invention the same has been illustrated in connection with six filtration plants or filter beds, which have been arranged or disposed in parallel rows, the filter beds being merely connected upon the drawings for the purpose of facilitating the understanding of this application of the invention.

Referring to the drawings the reference character 1 designates filter beds, preferably those known as slow sand filters, of the usual construction; and which are required to be scraped when the yield of water therefrom becomes diminished by reason of the surface or upper portion of the filtering material becoming clogged.

Heretofore it has been necessary to remove the surface or upper portion of the filtering material with broad shovels with long handles operated by laborers, who shoveled into piles the upper portion or crust of the filter, which is then shoveled into wheel-barrows and conveyed to the washing machine, and after being washed the filtering material is wheeled back and distributed manually over the bed from which it was removed.

Referring to the filter bed indicated at the lower left-hand corner of the drawing, there is shown therein or thereon a machine or apparatus 2, constructed to be progressed over the surface of a filter by an electric or internal combustion motor, and the machine 2 is preferably provided with conveyers or scrapers 3, constructed to remove the surface portion of the filtering material and progress the same toward the middle of the machine, where the material so progressed is taken up by an elevator 4, and discharged into an ejector or other device 5, having flexible inlet and outlet connections 6 and 7 respectively, the former communicating with a pipe or conduit 8, connected with the source of fluid supply, preferably by means of a pipe or conduit 9, and the pipe 9 is desirably connected with a similar inlet pipe 8 in the adjacent gallery or bay of the filter, any number of which bays or galleries may be employed according to the number of filter bays constituting the filtration plant or works.

The flexible outlet connection 7 is desirably in communication with an outlet pipe or conduit 10, having a connection 11 with a similar pipe or conduit 10 in the adjacent bay or gallery of the filter, and the outlet pipes 10 preferably deliver the material to a lateral pipe 12, having a connection with the first member 13 of a sand washer 14, the members or portions whereof are provided with connections 15, to the main supply pipe or conduit 9, substantially as shown; and the last member 16 of the washer is preferably provided with a connection 17 communicating with a cross pipe 18, attached to material supply pipe 19, one whereof is connected, preferably by means of a flexible pipe or hose 20, with a suitable portable distributing machine 21, desirably provided with an endless conveyer 22, to effect the distribution of the material delivered thereto through the flexible connection 20.

The parts, or elements or machines herein shown and described are not claimed herein *per se*, that is the same are not described and shown specifically and in detail because the specific construction and operation thereof does not constitute the subject matter of this application; but the combination, arrangement and operation and result attained by the instrumentalities herein shown and described is desired to be covered hereby.

The operation of the invention will be readily understood from the foregoing description when taken in connection with the accompanying drawing, and the following explanation thereof.

The conveying fluid or water is conveyed from the source of supply, preferably under pressure, through the main supply pipe 9 in the direction indicated by arrow on said pipe, from thence a portion of the water flows laterally into the pipe 8 and thence into the flexible connection 6 to the machine 2, where it passes through and out of the ejector 5, carrying with it the fouled filtering material which has been collected by the scraper 3 and raised and discharged into the ejector 5 by the elevator 4, the conveyed fluid and fouled filtering material passing from the ejector through the flexible outlet connection 7, outlet pipe or conduit 10, as indicated by arrows, and thence again laterally through the connecting pipe 11, and the lateral pipe 12, into the first element 13, of the washing machine 14, where the conveying fluid and fouled filtering material is washed, and conveyed from the washing machine, by a portion of the water entering the main supply pipe 9 and passing beyond the first pipe 8, to the washing machine, as shown by arrows on the drawing.

After the material shall have been washed or cleansed in the washing machine 14, it is finally discharged from the last element 16 thereof, and conveyed therefrom, by means of a portion of the water passing from the pipe 9, through the connection 17 to the cross pipe 18, communicating with an inlet pipe 19 in the adjacent bay or gallery of the filter, which pipe 19 in the second gallery is connected with a distributer 21, preferably by means of a flexible supply hose or tubing 20, and the cleansed material is again returned to the filter by means of the conveyer 22, or otherwise, of the distributing machine.

It is not desired to limit or confine this invention to the specific construction, combination and arrangement of parts herein shown and described, and the right is reserved to make all such changes in, and modifications of, the same, as come within the spirit and scope of the invention.

Claims—

1. A system for mechanically removing, cleaning and returning the sand of filter beds including means for gathering the sand in a heap on the surface of the filter bed, means for removing the sand therefrom, means for cleaning said sand, means for delivering the cleansed sand to and spreading the same over the surface of the filter bed and means for conveying said sand from the removing means to the spreading means through said cleaning means, each of said means being self-acting.

2. A system for mechanically removing, cleaning and returning the sand of filter beds including a machine adapted to travel upon the surface of a filter bed and to accumulate the sand in heaps thereon and remove the sand therefrom, means for cleaning said sand, a machine for mechanically delivering the cleansed sand to and spreading the same over the surface of the filter bed, and means for conveying said sand through said cleaning means from one to the other of said machines.

3. A system for mechanically cleaning filter beds including a scraping machine for scraping the sand from the surface of the filter bed, heaping the same thereon and removing the same therefrom, main inlet and outlet fluid pipes, connections between said pipes respectively and said machine, cleansing apparatus having connection with said main inlet and outlet pipes, a machine for delivering and spreading the cleansed sand over the surface of the filter bed and a connection between the latter machine and said cleansing apparatus, said machines and apparatus being self-acting.

In testimony whereof, I have signed my name to this specification, in the presence of two subscribing witnesses at Los Angeles, county of Los Angeles, State of California this second day of November 1904.

HIRAM W. BLAISDELL.

Witnesses:
H. T. MORROW,
MIGNON FORD.